United States Patent [19]

Storace et al.

[11] 4,122,906
[45] Oct. 31, 1978

[54] LOAD COUPLING DEVICE

[75] Inventors: Anthony Storace, Tarrytown, N.Y.; Paul R. Sette, Hamden, Conn.

[73] Assignee: Pitney-Bowes, Inc., Stamford, Conn.

[21] Appl. No.: 807,394

[22] Filed: Jun. 17, 1977

[51] Int. Cl.² .............................................. G01G 1/38
[52] U.S. Cl. ...................................................... 177/213
[58] Field of Search ................................... 177/213, 214

[56] References Cited

U.S. PATENT DOCUMENTS

| 1,283,556 | 11/1918 | Pool | 177/213 X |
| 1,405,322 | 1/1922 | Petersen | 177/213 UX |
| 3,279,552 | 10/1966 | Southall | 177/213 |
| 3,513,921 | 5/1970 | Reter et al. | 177/213 X |

Primary Examiner—George H. Miller, Jr.
Attorney, Agent, or Firm—Peter Vrahotes; William D. Soltow, Jr.; Albert W. Scribner

[57] ABSTRACT

A coupling device for adjusting the contact pressure between a balance weight and a rotative lead screw in an analytical balance. The weight is threaded upon the lead screw, and is advanced along a balance beam as the lead screw is caused to turn. The balance weight is substantially supported in rolling contact with the frame of the balance beam, and therefore, adds very little contact pressure to the lead screw connection. A leaf spring operatively connected between the balance weight and the lead screw adjusts the force exerted between the lead screw and the balance weight to a predetermined level.

4 Claims, 6 Drawing Figures

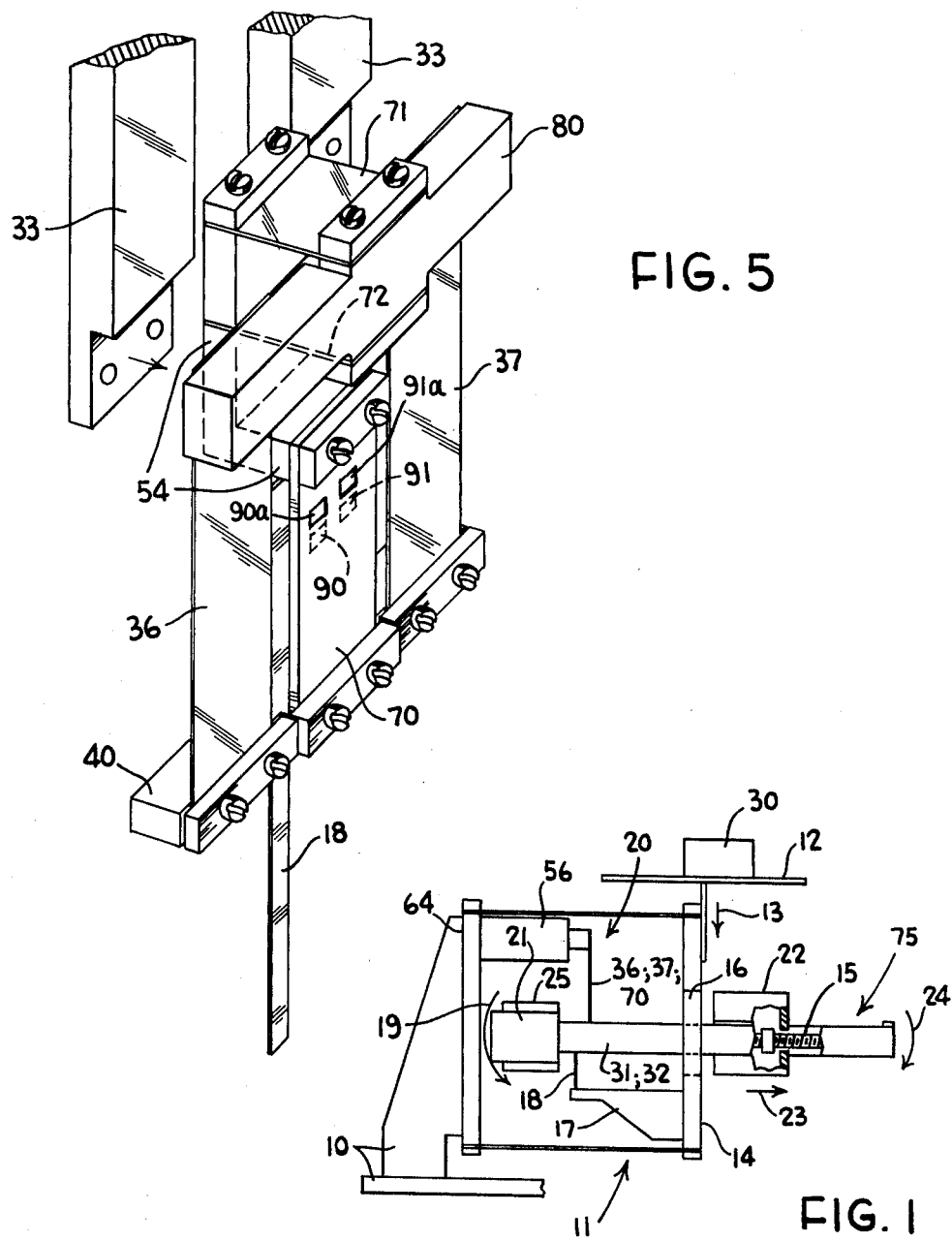
FIG. 5
FIG. 1
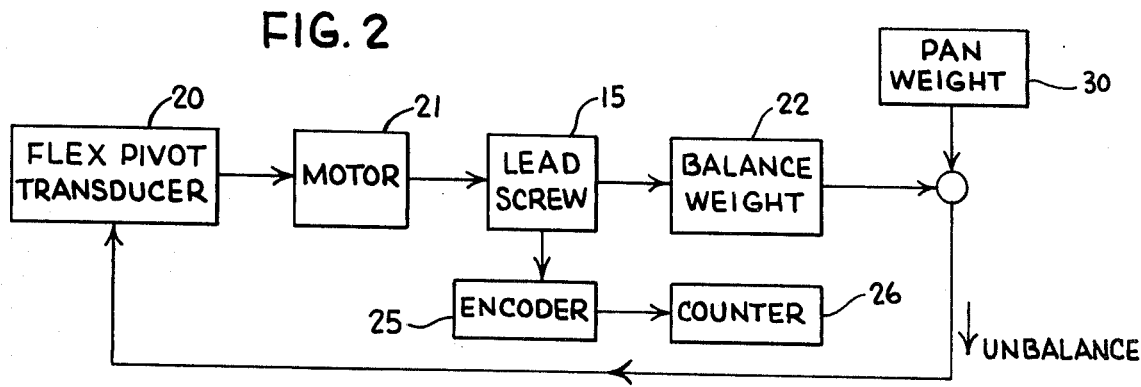
FIG. 2

4,122,906

LOAD COUPLING DEVICE

The invention pertains to a coupling device for adjusting the contact pressure between a lead screw and a threaded follower, and more particularly to an adjustable coupling for use between a balance weight and a balance beam of an analytical scale.

BACKGROUND OF THE INVENTION

In order to provide an accurate and sensitive analytical scale, the advancement of the balance weight along the balance beam must be accomplished with a minimum of frictional force. Since frictional force is dependent upon the normal force exerted by the balance weight upon the beam, it was conceived to support the balance weight in rolling movement upon the beam.

This scheme was sufficient to eliminate friction effects, but introduced the problem of backlash in the lead screw connection. In other words, some force in the lead screw connection was still necessary to provide accurate coupling between the balance weight and the lead screw drive. The invention was conceived as an adjustable coupling device for the aforementioned connection, which would provide a predetermined force or pressure.

SUMMARY OF THE INVENTION

The invention relates to an improvement in an automatic analytical balance. A coupling device for adjusting the contact pressure between a lead screw and a balance weight provides for accurate and sensitive scale operation. The coupling device comprises a frame which supports a weight member in rolling movement. A rotative lead screw is rotatably journaled in the frame and extends through the weight member. A leaf spring having a threaded member on one end is in threaded engagement with the lead screw, while being fixed to the weight member on another end. As the lead screw is caused to turn, the threaded member is caused to advance upon the lead screw, thus forcing the leaf spring to move said weight member.

It is an object of this invention to provide an improved coupling device for use in an automatic analytical balancce;

It is another object of the invention to provide a coupling for adjusting the contact pressure between a lead screw and a weighted follower member;

It is yet another object of this invention to provide a predetermined coupling force between a balance weight and a balance beam lead screw;

These and other objects of this invention will be better understood and will become more apparent with reference to the following detailed description taken in conjunction with the attached drawings, in which:

FIG. 1 is a schematic side view of the analytical balance of the invention;

FIG. 2 is a functional block diagram for the analytical balance shown in FIG. 1;

FIG. 5 is a perspective view of a null indicating transducer shown in FIG. 3.

DETAILED DESCRIPTION

Figure 3:
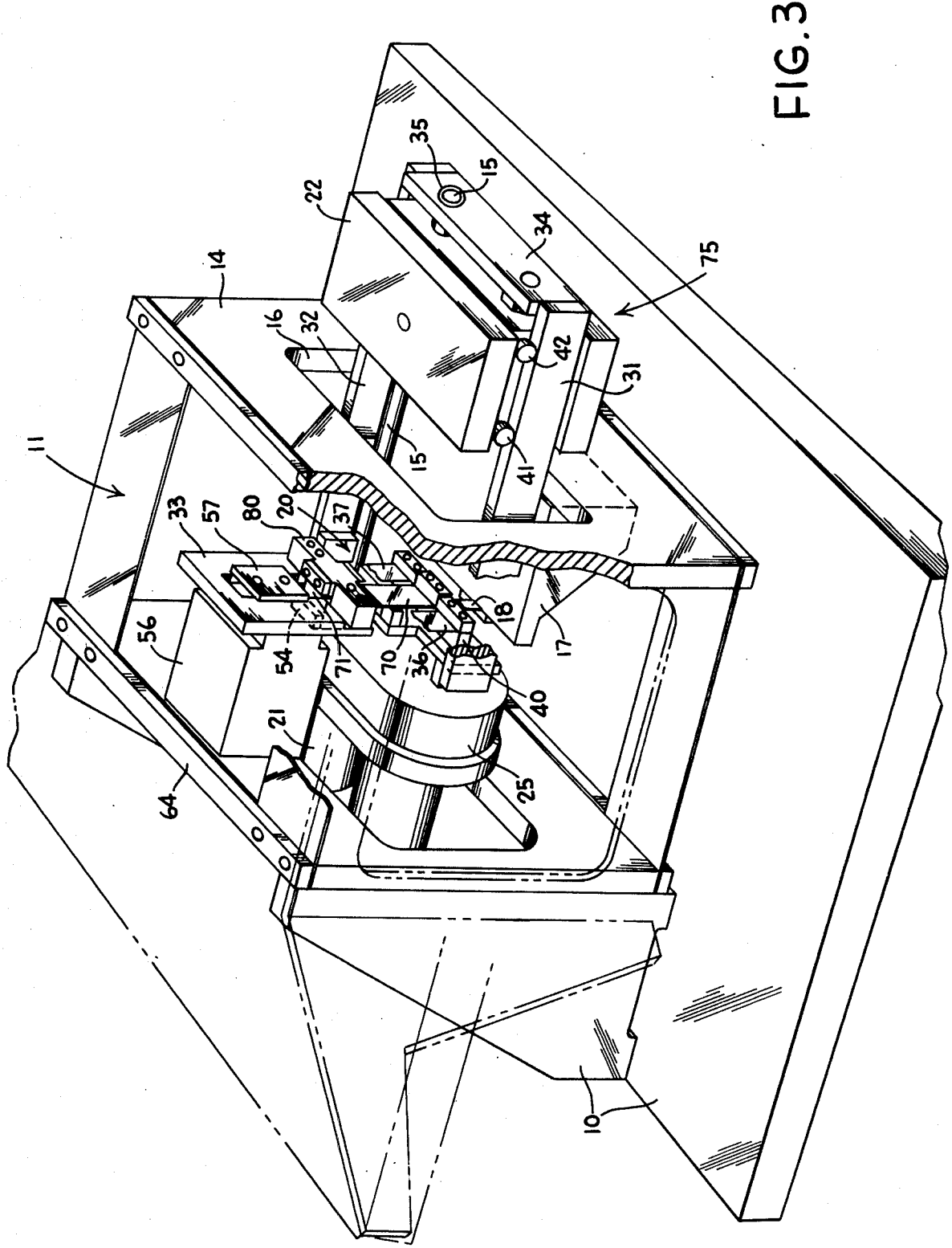
FIG. 3 is a perspective view of the analytical balance illustrated in FIG. 1.
Figure 4:
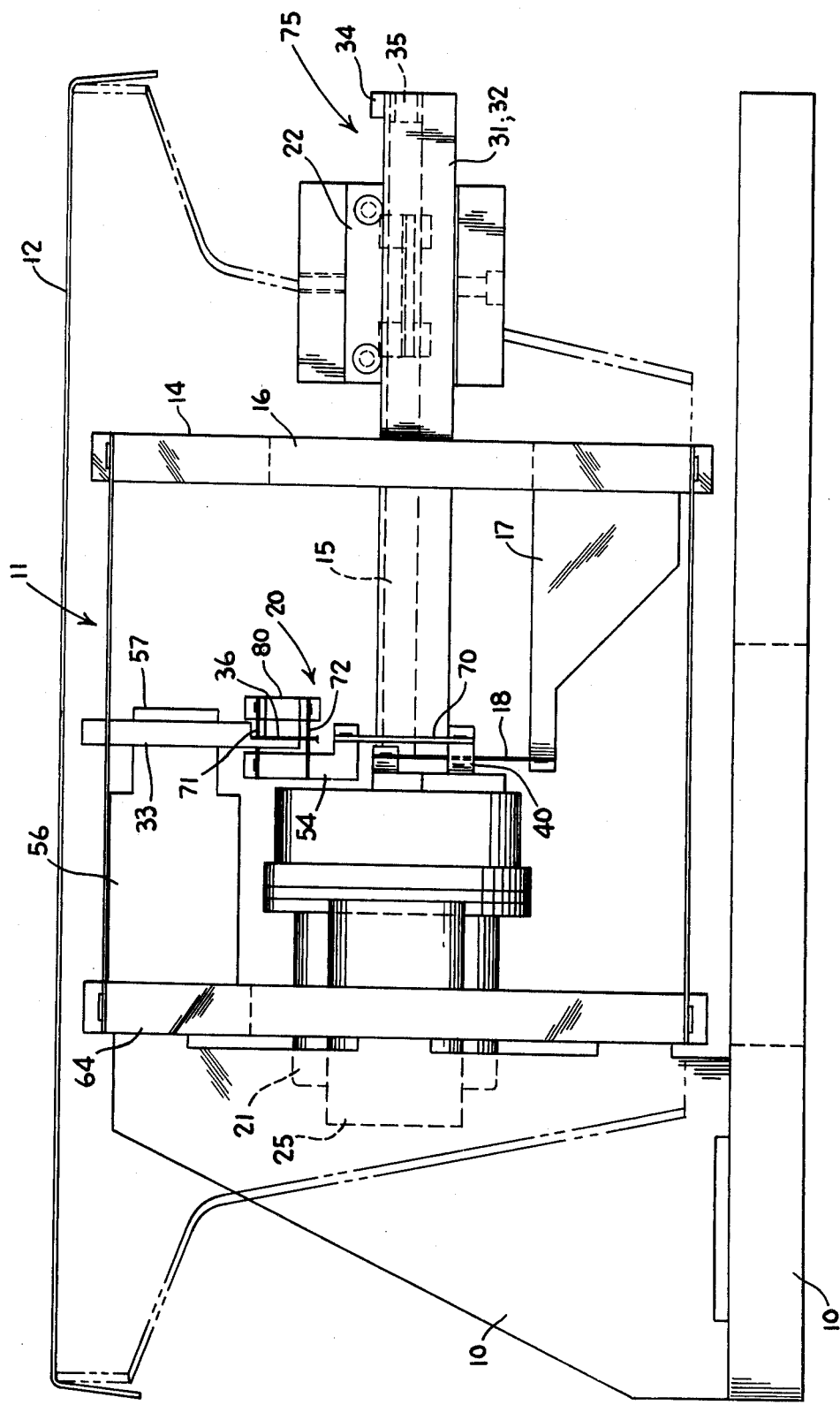
FIG. 4 is a side view of the analytical balance depicted in FIG. 3.

Referring to FIGS. 1, 3 and 4, schematic and constructional views of the inventive analytical balance are shown. The scale consists of a base and frame member 10, to which a flexural load support structure 11 is attached. The flexural support 11 can be of a twin leaf spring construction, or it may be a flexural pivot assembly, etc. A pan 12 is attached to the movable wall 14 of the flexural support 11 (FIG. 1) and will deflect (arrow 13) when a load 30 to be weighed is placed thereupon.

A pivotable shaft 15 extends horizontally through a portal 16 in flexural wall 14. A flange member 17 attached to, and extending from, the wall 14 is attached to the pivotable shaft 15 via a thin metal band 18. Thus, as the pan 12 deflects (arrow 13), the pivotable shaft 15 will be caused to pivot in a counterclockwise direction as shown by arrow 19. A null indicating transducer shown generally by arrow 20, and illustrated in greater detail in FIG. 5, senses the imbalance from the horizontal sensing transducer 20 generates a signal which is sent to a motor 21. The motor 21 is attached to the shaft 15, and causes the shaft 15 to rotate in response to the unbalanced signal sent by transducer 20.

Shaft 15 has at least a portion thereof, that is threaded. In other words, shaft 15 can be thought of as a lead screw. When the lead screw (shaft 15) is rotated, a displaceable weight 22, that is threaded upon shaft 15, is caused to be advanced upon the shaft. The shaft 15 is rotated, and the weight 22 is moved, in such a manner as to bring shaft 15 into a horizontally balanced condition. In other words, the weight 22 is advanced along shaft 15 in direction 23 in order to cause a clockwise pivoting 24 of shaft 15. The weight 22 is advanced until the transducer 20 senses a balanced condition, at which time, the motor 21 receives a signal from transducer 20 to stop rotating shaft 15.

The distance from the initial starting position from which the weight has moved, is indicative of the weight of the load that has been placed on pan 12. This distance can be measured from the amount of turns given to shaft 15 by the motor 11. For this purpose, the shaft 15 and motor 21 are operatively connected to a shaft encoder 25. This encoder 25 measures the number of revolutions of the shaft. This measurement is then fed to a counter, and is converted to a weight reading. The encoder used for this purpose may be of the type manufactured by Disc Instruments, Inc., Costa Mesa, Calif.; Model EC80 Rotaswitch.

FIG. 2 shows in block diagram how the analytical balance system operates. When an unknown weight is placed on the pan 12, the pan weight 30 causes a pivoting of shaft 15 resulting in transducer 20 sensing an unbalance. The transducer 20 will actuate the motor 21, which will rotate lead screw (shaft) 15. Shaft 15 will rotate to advance the known balance weight 22, which will pivot the shaft 15 in an opposite sense, to eliminate the imbalance being sensed by transducer 20.

When a balanced condition is finally achieved, the encoder 25 will measure the total rotation of the lead screw 15, and will feed this information to a counter (conversion unit) 26 to convert this measurement into a direct weight reading.

The calculation necessary for this conversion is well known, and involves a summation of the moments about shaft 15, i.e., the known weight 22 multiplied by the distance it has traveled along shaft 15, equals the unknown weight 30 multiplied by the given distance it acts about the flexure pivot point of shaft 15. Solution of this moment equation will provide the weight of unknown weight 30.

Figure 6:
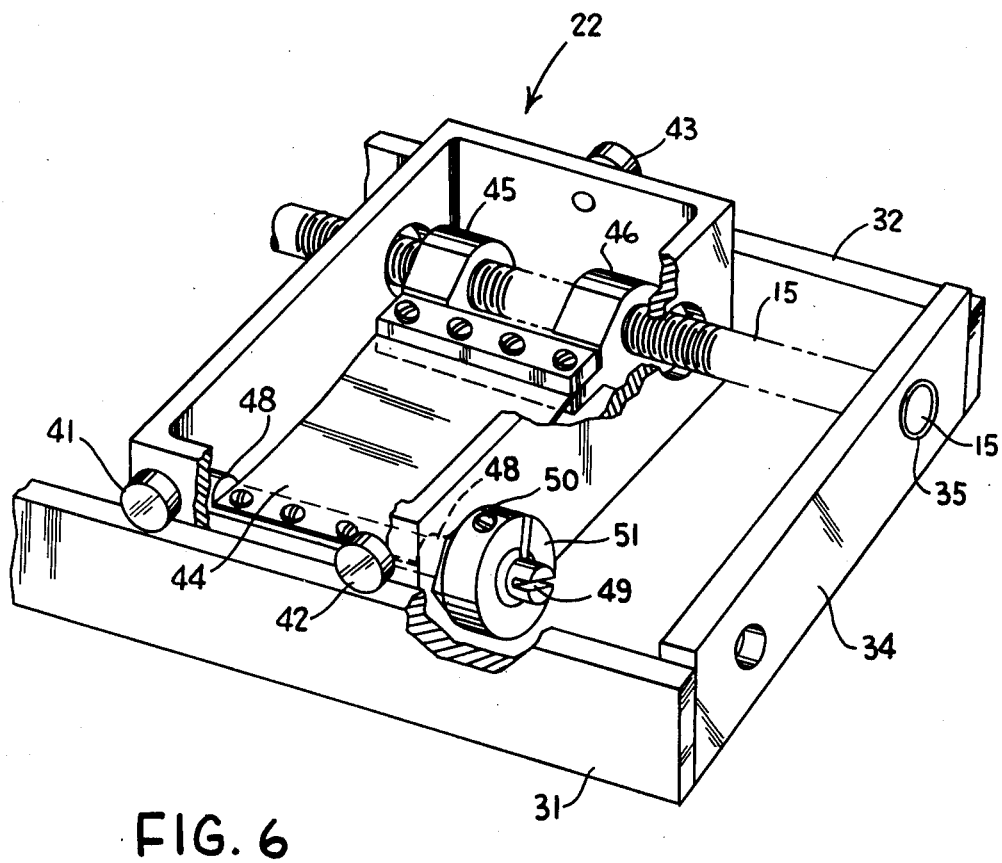
FIG. 6 is a perspective cutaway view of a balance weight and lead screw construction for eliminating backlash, as shown in the analytical balance of FIG. 3.

Referring to FIGS. 3, 4, and 6; the movable weight 22 and shaft 15 are shown in greater detail. The shaft 15 is actually part of a pivotable assembly 75 comprising side arms 31 and 32, which form an elongated box-like frame. The assembly or frame 75 comprises a cross-member 34 connected across arms 31 and 32, respectively. Shaft 15 is rotatably journalled within this frame, as can be seen from bearing 35, which is shown in cross-member 34 depicted in FIGS. 3 and 4. The shaft 15 and the frame pivot is a unit assembly, and are supported in pivotable movement by bands 36 and 37 of transducer 20, as will be explained in more detail thereinafter. The frame is secured to block 40 which in turn sandwiches bands 36 and 37 between blocks 38 and 39 (see FIG. 5).

In order that a fine adjustment be possible in the analytical balance, it is necessary to eliminate friction and backlash between the lead screw (shaft 15) and weight 22. To this end, the weight 22 has been designed to be primarily supported by rolling friction. Weight 22 is designed in box-like shape as seen in FIGS. 3 and 6. The weight itself carries three wheels 41, 42 and 43, which support weight 22 in rolling upon the arms 31 and 32 as shown. Since the arms 31 and 32 support the weight 22, very little friction is obtained at the lead screw connection between the weight 22 and shaft 15. Thus, the shaft 15 can very accurately and precisely move weight 22.

However, because a given amount of friction is still desirable to prevent backlash, a scheme was devised to load the lead screw with a given or predetermined amount of force. A leaf spring 44 is secured to journal members 45 and 46, respectively, as shown in FIG. 6. Journal members 45 and 46 are threaded to lead screw 15. The leaf spring 44 is secured to weight 22 via a shaft 48 which is journalled within weight 22. The shaft 48 can be rotated by the head of a screw driver placed in slot 49, in order to put tension in leaf spring 44. This tension will load the lead screw with a desired or given force via journals 45 and 46. A lock nut 51 and set screw 50 will hold shaft 48 in place in order to maintain the given tension on leaf spring 44. Thus, it will be seen that while the force of the weight 22 has been removed from the lead screw connections in journals 45 and 46, a predetermined force is put back in order to eliminate backlash via leaf spring 44.

Referring now to FIG. 5, the transducer 20 will be explained in greater detail. As aforementioned, the pivotable frame 75 is secured to bands 36 and 37, respectively, and thus the weight of the pivotable frame 75 is carried by these bands. Bands 36 and 37 are each in turn secured and supported by hollowed-out frame 33, which is rigidly attached to the main frame 10 via clamp 57, block 56, and wall 64. Thus, it is seen, that bands 36 and 37 support the major portion of the weight of the pivotable assembly 75, which support is directly traceable back to the main frame 10.

Bands 36 and 37 are made very thin relative to center band 70 of the transducer 20. This allows the pivotable assembly 75 to pivot easily, because bands 36 and 37 provide very little in the way of flexural resistance to this assembly.

Center band 70, is designed to be relatively thick and somewhat resistive to bending of the pivotable frame 75, and is connected to L-shaped flange 54, which is bendably supported by twin leaf springs 71 and 72. Leaf spring 71 and 72 are anchored to cross-bar 80, which in turn is secured to hollowed-out frame 33. Band 70 is connected on its other end to the pivotable assembly 75 via block 40.

Thus it can be seen, that the center band 70, while resistive to bending gives way to both bending and tension.

Thinner bands 36 and 37 are stiff or unyielding in tension or axial loading while the thicker center band is relatively soft and yieldable in tension or axial loading.

Thus, the two outer bands 36 and 37, while shouldering most of the weight of pivotable assembly 75, are almost completely yieldable to the pivoting moments of the assembly 75.

The center band 70, on the other hand, is yieldable to bending moments induced by assembly 75, and almost completely yieldable in the tension or axial loading produced by the assembly 75.

On the back of band 70 are mounted four strain gage elements 90, 90a, 91 and 91a, respectively. These strain gage elements detect the pivoting of assembly 75 in either a clockwise or a counterclockwise direction, respectively.

The accuracy of the strain gages 90, 90a, 91 and 91a for detecting pivoting of assembly 75 is greatly enchanced by the structural arrangement of bands 36, 37, and 70. These gages will not be distorted by the stresses induced by the weight of assembly 75, because this loading is supported by bands 36 and 37. These gage elements 90, 90a, 91 and 91a will also be free from deflecting errors because of the bendable supporting bridge comprising leaf springs 71 and 72. The strain gages, which are electrically arranged in a Wheatstone bridge will, however, be sensitive to the moments of the assembly 75.

Because of the unique construction of transducer 20 and the weight 22, it will be evident that a very sensitive automatic analytical balance has been obtained consistant with the prior mentioned objects of the invention.

Having described the invention, what is desired to be protected by Letters Patent is presented by the appended claims.

What is claimed is:

1. In an analytical balance having a movable balance weight displaceable along a pivoting balance beam, the balance weight and balance beam combination comprising:

a frame mounted for pivotable movement in response to the advancement of the balance weight upon the frame;

the balance weight being mounted for rolling movement upon said frame;

a rotatably lead screw being rotatively journalled upon said frame and being operatively connected to said balance weight to drive said balance weight along said frame, said frame substantially supporting the entire weight of the balance weight; and means for biasing the balance weight into operative contact with said rotative lead screw, comprising a leaf spring connected to said balance weight at one end thereof and having a threaded journal member rotatively engaged with said lead screw and connected to said leaf spring on another end thereof, whereby as said lead screw is caused to rotate, the journal member will be caused to advance upon said lead screw, thus forcing the leaf spring to move said balance weight upon said frame.

2. The balance weight and balance beam combination of claim 1, wherein said balance weight has a box-like shape.

3. The balance weight and balance beam combination of claim 1, wherein said biasing means further comprises adjusting means for adjusting the biasing of said biasing means, such that the journal member will be capable of contacting the lead screw with a predetermined force.

4. A load coupling device, comprising:
 a frame;
 a weight member supported upon said frame for rolling movement thereon;
 a rotative lead screw rotatably journaled in said frame and extending through said weight member; and
 a leaf spring having a threaded member attached to one end thereof, said threaded member being in threaded engagement with said lead screw, said leaf spring being fixed to said weight member on another end thereof.

* * * * *